United States Patent

Sharma et al.

[11] Patent Number: 5,646,484
[45] Date of Patent: Jul. 8, 1997

[54] HIGH RELIABILITY INCANDESCENT PORTABLE ILLUMINATION SYSTEM

[75] Inventors: Madan Sharma, Palos Verdes; Ronald M. Schmidt, Burbank; Alfred T. Schmidt, North Hollywood, all of Calif.

[73] Assignee: Litebeams, Inc., Burbank, Calif.

[21] Appl. No.: 547,021

[22] Filed: Oct. 23, 1995

Related U.S. Application Data

[63] Continuation of Ser. No. 333,221, Nov. 2, 1994, abandoned.

[51] Int. Cl.$^6$ ........................................... H01J 7/44
[52] U.S. Cl. .......................... 315/74; 315/88; 315/91; 315/119; 315/106; 313/236
[58] Field of Search .................................. 315/308, 307, 315/119, 91, 74, 92, 106, 107, 65, 88; 313/236

[56] References Cited

U.S. PATENT DOCUMENTS

| | | | |
|---|---|---|---|
| 3,725,728 | 4/1973 | King | 315/119 |
| 4,283,657 | 8/1981 | Gordon et al. | 315/86 |
| 4,450,384 | 5/1984 | Krokaugger | 315/127 |
| 4,464,607 | 8/1984 | Peil et al. | 315/209 R |
| 4,706,177 | 11/1987 | Josephson | 363/24 |
| 4,998,044 | 3/1991 | Nilssen | 315/200 C |
| 5,017,838 | 5/1991 | Nilssen | 315/200 R |
| 5,083,062 | 1/1992 | Ichihara | 315/241 P |
| 5,144,203 | 9/1992 | Fujita et al. | 315/169.3 |
| 5,151,631 | 9/1992 | Oda et al. | 315/127 |
| 5,155,415 | 10/1992 | Schmidt | 315/307 X |
| 5,166,578 | 11/1992 | Nilssen | 315/209 R |
| 5,189,344 | 2/1993 | Rose | 315/293 |
| 5,214,353 | 5/1993 | Nilssen | 315/33 |
| 5,241,242 | 8/1993 | Daub | 315/82 |

*Primary Examiner*—Frank Gonzalez
*Assistant Examiner*—Reginald A. Ratliff
*Attorney, Agent, or Firm*—Blakely Sokoloff Taylor & Zafman

[57] ABSTRACT

A high reliability portable incandescent illumination system for use in applications which require a reliable, high output light source such as heliport markers, runway lights, warning lights, road hazard and obstruction lights. The required elements of the invention are a battery to provide an energy source, a DC/DC converter to step up the battery voltage to a level required to drive a high output light source. The DC/DC converter is driven by a controller which generates a pulse stream to the DC/DC converter based upon inputs from a soft start circuit, a filament temperature sensor, an optical spectrum sensor, a power sensor and a filament break sensor. The optical spectrum sensor is coupled to the light source by a fiber optical element. An improvement in results in the performance of portable beacons by using high voltage lamps with low voltage batteries via voltage step-up electronics.

11 Claims, 2 Drawing Sheets

HIGH RELIABILITY INCANDESCENT PORTABLE ILLUMINATION SYSTEM

This a continuation of application Ser. No. 08/333,221 filed Nov. 2, 1994, now abandoned.

FIELD OF THE INVENTION

The invention is in the field of portable illumination systems and more specifically wide angle viewing beacons or hazard warning lights.

SUMMARY OF THE INVENTION

This invention utilizes the inventor's understandings of light radiation patterns of long and short filament incandescent bulbs when used with dispersive lenses.

Since the reliability of incandescent lamps is poor, the invention incorporates several protective mechanisms to minimize failures. Products based on this invention are specially suited for airport lightup, beacons for helicopter landing zones, hazard warning lights for disaster areas.

Most portable lights are low voltage systems. Low voltage incandescent bulbs are powered by up to 24 volt DC batteries. Low voltage bulbs have short filaments which act like a point source of light whose radiation pattern is highly anisotropic. What is needed in beacons and warning lights is a highly dispersive radiation pattern that is visible from all angles.

High voltage incandescent bulbs, such as 120 volts or 240 volts, have long filaments and are considered large area emitters which have superior dispersive radiation patterns. Beacons using high voltage lamps, therefore, have an isotropic radiation pattern which is best for all angle viewing.

This invention enhances state of the art by improving the performance of portable beacons by using high voltage lamps with low voltage batteries via voltage step-up electronics. Further, Since the reliability of incandescent bulbs is rather poor, safety electronics such as voltage regulation, power regulation, filament break detector, and fiber-optic spectrum analyzer, have been added to minimize failures.

DETAILED DESCRIPTION OF THE INVENTION

The invention is directed to a high reliability portable incandescent illumination system for use in applications which require a reliable, high output light source such as heliport markers, runway lights, warning lights, road hazard and obstruction lights.

Figure 1:
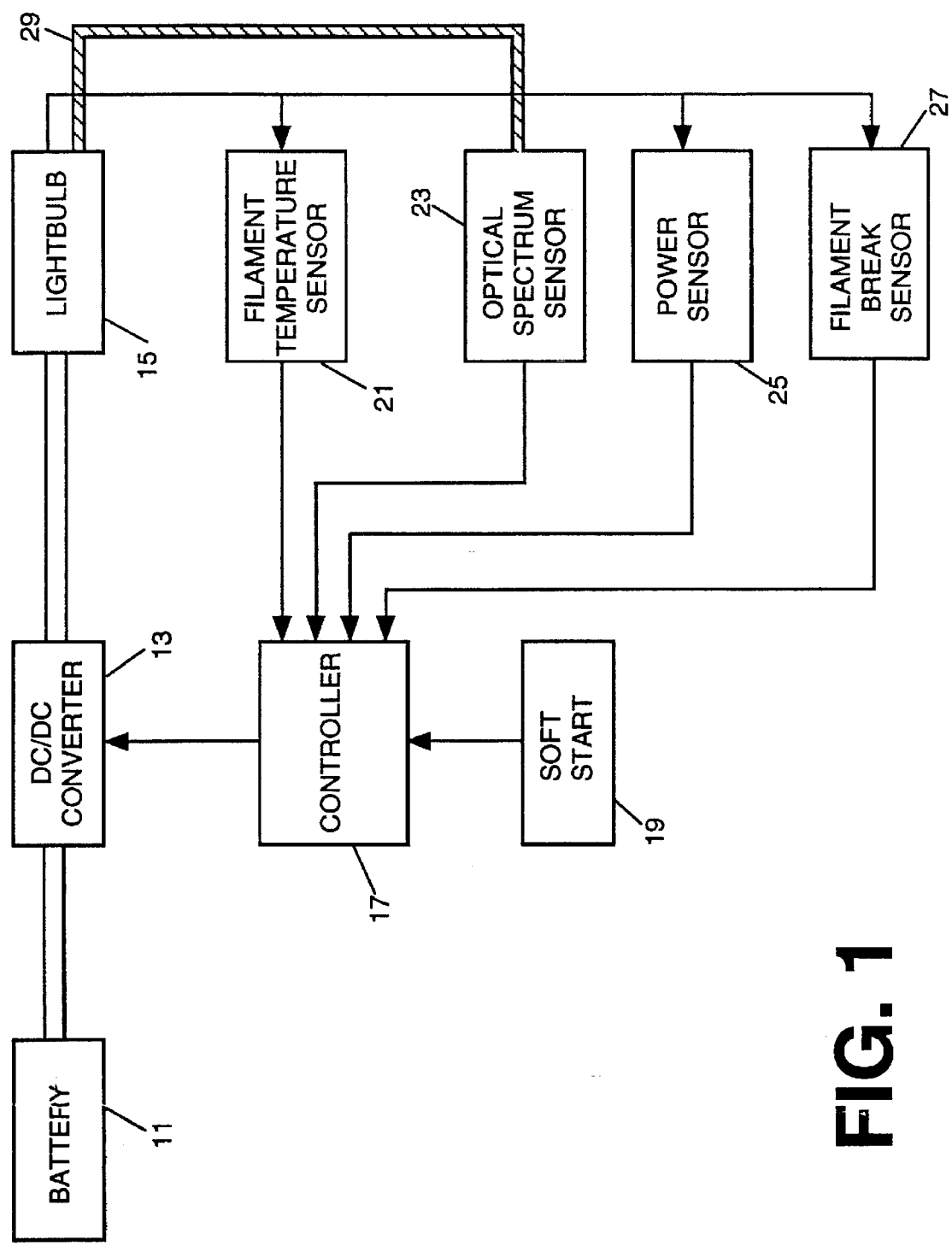
FIG. 1 is a block showing the essential elements of a portable illumination system according to the present invention.

The required elements of the invention are, as shown in FIG. 1, a battery 11 to provide an energy source, a DC/DC converter 13 to step up the battery voltage to a level required to drive a high output light source 15, typically 120–240 volts, although light sources which require more or less voltage can also be employed. The DC/DC converter is driven by a controller 17 which generates a pulse stream to the DC/DC converter based upon inputs from a soft start circuit 19, a filament temperature sensor 21, an optical spectrum sensor 23, a power sensor 25 and a filament break sensor 27. The optical spectrum sensor is coupled to the light source 15 by a fiber optical element 29. The other components are coupled to each other by copper or other electrically conductive wire.

Figure 2:
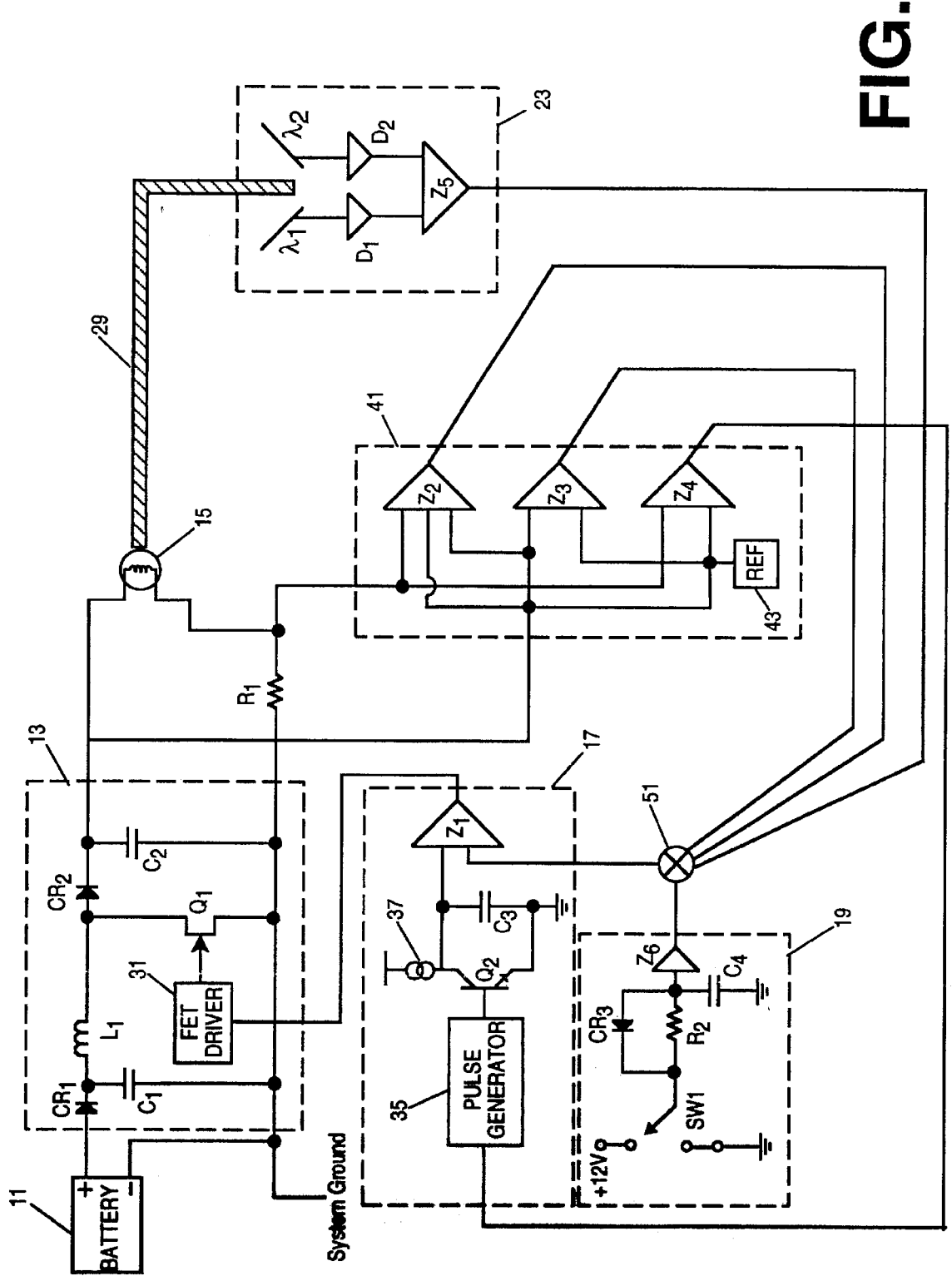
FIG. 2 is a schematic diagram showing one embodiment of the invented portable illumination system.

A specific implementation of the invention will now be described with reference to FIG. 2. In FIG. 2, elements with the same reference number as elements in FIG. 1 represent the same functional element.

Battery 11 may be implemented using any portable power source such as: 1.5 V, 6, 12, 24, 28, 48 volt or any other portable battery whether NiCad, lead acid, gel cell, dry cell, fuel cell, or other battery. Of course, the battery capacity would be a function of the application and cost requirements.

DC/DC converter 13 may be implemented using a back/boost inverter which takes battery voltage and converts it to a high DC voltage such as 120 V or 240 V appropriate for the incandescent bulb 15. Diode $CR_1$ is a polarity protection diode used to protect the system against reverse polarity connections to battery 11. Capacitor $C_1$ is a filter capacitor connected in parallel with the battery 11 and light source 15. Inductor $L_1$ is a boost inductor for converting interrupted direct current to a high voltage alternating current. Transistor $Q_1$ is a power FET usually a MOSFET which operates the inverter by operating as a switch which opens and closes causing the direct current through inductor $L_1$ to switch on and off thereby generating a high voltage alternating current with a frequency and pulse width which is a function of the frequency at which transistor $Q_1$ opens and closes. Diode $CR_2$, which is connected in series with diode $CR_1$ and inductor $L_1$, rectifies the alternating current signal generated by inductor $L_1$ prior to being provided to light source 15 in order to produce a more even light output. Capacitor $C_2$ also coupled in parallel with light source 15 is an output filtering capacitor which operates with diode $CR_2$ to produce a more even light output. FET driver 31 is a FET gate driver such as a MDC 1000A available from Motorola.

Light source 15 is any incandescent light source. Suitable light sources which may be used are 30 to 300 watts FAA approved lamps designated as 6.6 AMPS-T-10 units.

Controller 17 provides a pulse width modulated pulse stream to DC/DC converter 13 and is implemented using a pulse generator 35 which generates clock pulses and a pulse width modulator. For a typical application, pulse generator 35 generates 5K to 250K pulses. The factors which are utilized to determine the desired frequency of the generated pulses are optimum voltage across the lamp, desired power to the lamp, optical spectrum balance and ambient temperature. Pulse generator 35 may be implemented using an integrated circuit, LM555, available from National Semiconductor Company. The remaining components of controller 17 may be implemented using a constant current generator 37 such as an FET diode, reset transistor $Q_2$ such as NPN transistor 2N4401, timing capacitor $C_3$, and comparator $Z_1$. Comparator $Z_1$, using start/stop and output intensity control signals from sensor circuits 23 and 25 operates to produce a pulse width modulated pulse stream for input to the DC/DC converter as follows. Pulse generator 35 produces short duration timing pulses at a constant repetition rate. Each pulse turns-on transistor $Q_2$ to discharge the timing capacitor $C_3$. After the timing pulse has returned to zero, the transistor Q2 opens-up and allows $C_3$ to charge up through the constant current generator 37. The output of this combination is a saw-tooth wave form with constant amplitude and frequency. $Z_1$ is a comparator which compares the saw tooth wave form with a reference voltage generated by sensors 21, 23, 25 and 27. The output of the comparator is a sequence of square waves with varying symmetry thereby producing a varying duty cycle proportional to the reference voltage at the comparator $Z_1$.

Soft start circuit 19 provides a ramp function during turn-on to avoid in rush current through light source 15. Switch $SW_1$ is an on-off switch. Resistor $R_2$, diode $CR_3$, capacitor $C_4$ and comparator $Z_6$ operate so that when switch $SW_1$ is switched from the off to the on position, thereby coupling power from battery 11 to the rest of the circuit, instead of current being supplied in a sudden surge to light source 15, current is supplied as a ramp function depending on the RC time constant of resistor/capacitor combination $R_2/C_4$. Suitable values for the resistor and capacitor to provide a suitable time constant would depend on the battery and light source being used, but the specifics should be readily apparent to persons skilled in the art. It should be noted that soft start circuit 19 modifies the pulse width pulse train only during the "turn-on" of the system.

Sensor circuit 41 performs the functions of filament temperature sensor 21, power sensor 25 and filament break sensor 27 of FIG. 1. Sensor circuit 41 is implemented using comparators $Z_2$, $Z_3$, and $Z_4$.

Comparator $Z_2$ multiplies the voltage being provided to light source 15 by the current flowing through light source 15 to sense the power being consumed by light source 15. The output of comparator $Z_2$ is coupled to signal combiner 51. The signal combiner comprises a set of resistors and a summing amplifier. This combiner combines the outputs of 3 comparators ($Z_2$, $Z_3$, and $Z_4$) and outputs a correction signal for comparator $Z_1$. This correction signal is used to regulate the power into light source 15. In a preferred embodiment of this invention, comparator $Z_2$ may be implemented as a combination analog multiplier and a comparator. Voltage and current sensed by the current sensing resistor $R_1$ are multiplied via the analog multiplier inputs. The output is a DC signal proportional to the power applied to the light source. The comparator portion compares the power signal with a presettable reference 43 to keep the power into the light source at a predetermined constant level.

Combiner 51 simply combines the signals arriving from the sensors and soft start circuit 19 and passes the combined signals to controller 17.

Comparator $Z_4$ compares a reference voltage 43 to the voltage being supplied to light source 15 to sense the rise in filament resistance to predict the filament failure and shut-off the converter. The output of comparator $Z_4$ is coupled to pulse generator 35 and is used to output a DC high signal thereby causing comparator $Z_1$ to output a DC signal so that FET driver 31 keeps transistor $Q_1$ closed thereby eliminating current flow through light source 15 to allow the filament to cool so that it will not break at an unexpected time. Comparator $Z_4$ senses current through the lamp by measuring the voltage drops across the current sensing resistor $R_1$. Since any abrupt decrease in this voltage is caused by excessive filament temperature indicating an impending burnout, the signal output from $Z_4$ shuts-off the converter 13 which allows the light source to cool down.

Comparator $Z_3$ compares the voltage across lamp 15 to reference voltage 43 to keep the voltage across the lamp constant. Comparator $Z_3$ generates an error signal when the voltage across the lamp deviates from a preset value. The error signal is an output voltage proportional to the difference between reference 43 and a measured voltage. This error signal, at the output of $Z_3$, modifies the output of converter 13 via the combiner 51. In the preferred embodiment, comparator $Z_3$ is implemented as a differential amplifier.

Optical spectrum sensor 23 is implemented using fiber optic link 29, optical filters $\lambda_1$ and $\lambda_2$, detectors $D_1$ and $D_2$, and comparator $Z_5$ to evaluate the spectral contents of the output of the incandescent bulb. Fiber optic link 29 is arranged so that one end is adjacent to lamp 15 and parallel to and aligned with the filament of the bulb. The output of optical spectrum sensor 23 is coupled to combiner 51 and operates to modify the pulse width stream to control the spectral output of the light source so that it is maintained at its optimum value which is defined as a specified ratio of output power at $\lambda_1$ and $\lambda_2$. The fiber optic link may be implemented using a plastic fiber with good transmission characteristics in the range of 3000° A to 5000° A.

Optical filters $\lambda_1$ and $\lambda_2$ may be implemented as gel filters or implemented as gel or dielectric filters affixed to detectors $D_1$ and $D_2$. Detectors $D_1$ and $D_2$ are silicon photo diodes whose output current is proportional to the light input. Comparator $Z_5$ compares the outputs of $D_1$ and $D_2$ and outputs a DC signal proportional to the difference between its two inputs. This differential signal is applied to controller 17 to modify the lamp voltage to keep the differences between the $D_1$ and $D_2$ outputs to a minimum.

Thus, the drive voltage applied to the light source, lamp current flowing through the light source and the optical spectrum generated by the light source are processed by the sensing circuit 41 and optical spectrum sensor 23 to control the DC/DC converter so that the voltage and current supplied to light source 15 to provide a high output incandescent light which is both portable and highly reliable.

The invention provides improved reliability over prior art controllers of incandescent lights due to voltage, current, and power feedback. The slow-start, dc operation of the lamp, and the spectral control further improve the reliability factor. These features also provide consistent performance under varying conditions such as: changing battery conditions, ambient temperature, and the age of the lamp.

Additionally, the failure of an incandescent lamp not only impacts the reliability, but also creates a hazard in volatile environments. In particular, when the light source breaks due to accident or the like, the filament oxidizes and heats abruptly causing it to melt and break. During the break the two breaking ends start to depart from each other promulgating an arc. This arc can cause an explosion in an environment. In the present invention, the filament break detector shuts-off the power to the light source before the arc can take place.

The above described failure has several indicators. When the current through the light source decreases abruptly and voltage across the light source is still present, failure of the light source is imminent. This sudden decrease in current stems from an abrupt increase in the resistance of the filament caused by an abrupt increase in the filament temperature.

The present invention includes a safety circuit for detecting such a failure and preventing its occurrence. The present invention has a safety circuit comprising comparators $Z_3$ and $Z_4$ that detect the danger condition (i.e. abrupt decrease in current through the light source coupled with a constant voltage difference across the lamp). Further, this safety circuit turns off $Q_1$ and allows the light source to cool. Thus, both failure detection and prevention are incorporated into the present invention.

I claim:

1. A system for controlling power from a low voltage power source supplied to a high voltage incandescent light source having a dispersive light isotropic radiation pattern, said system comprising:

a) a low voltage power source;

b) converter means coupled to said low voltage power source for producing a high voltage power source;

c) said high voltage incandescent light source having a filament coupled to said converter means;

d) controller means coupled to said converter means for generating a pulse width modulated pulse stream at a frequency which results in an optimum power being supplied to said light source as determined by said light source notwithstanding changes in power output by said low voltage power source and changes in the light output by said incandescent light source resulting from aging of said filament;

e) soft start circuit means coupled to said controller means and generating a signal for preventing an in rush current being supplied to said light source during turn-on;

f) filament sensor means coupled to said controller means for measuring relative temperature of said filament, relative power supplied to said filament and determining if said filament is about to break and generating a set of signals which are used by said controller means to modify the pulse stream output to said converter means;

g) optical spectrum sensor means coupled to said controller means for evaluating the spectral contents of the output of said incandescent light source and generating a signal which is used by said controller means to modify the pulse stream output to said converter means.

2. The system define by claim 1 wherein said low voltage power source is a battery.

3. The system defined by claim 1 wherein said converter means comprises:

a) a back/boost inverter including an inductor coupled to said low voltage power source through a polarity protection diode;

b) a transistor switch coupled to said inductor, said transistor switch operating to switch direct current produced by said low voltage power source through said diode and inductor on and off to thereby generate a high voltage alternating current with a frequency and pulse width which is a function of the frequency at which said transistor switch opens and closes;

c) a driver coupled to said transistor switch, said driver receiving from said receive said pulse width modulated pulse stream said transistor switch on and off as a function of said generated signals.

4. The system defined by claim 1 wherein said controller means comprises:

a) a pulse generator for generating a pulse stream of at a set of frequencies within a predetermined range;

b) a reset transistor whose base is coupled to the output of said pulse generator;

c) a constant current source coupled to the collector of said reset transistor;

d) a timing capacitor coupled between the collector and emitter of said transistor;

e) a comparator having one input coupled to said timing capacitor and collector of said transistor and a second input which receives said generated signals from said soft start circuit means, said filament sensor means and said optical spectrum sensor means.

5. The system defined by claim 1 wherein said soft start circuit means comprises:

a) an on/off switch;

b) a resistor-capacitor time constant circuit coupled to said on/off switch and said controller means wherein, said soft start circuit operates to modify the pulse width modulated pulse stream produced by said controller means to cause current to be supplied to said incandescent lamp as a ramp function when said switch is switched from an off position to an on position.

6. The system defined by claim 1 wherein said filament sensor means comprises:

a) a first comparator (Z3) having one input coupled to a first end of said filament and a second input coupled to a reference voltage, said first comparator generating a correction signal when the voltage across said light source deviates from a predetermined value.

b) a second comparator (Z2) having one input coupled to a second end of said filament and to said converter means through a current sensing resistor and a second input coupled to said first end of said filament, said second comparator generating an error signal when power across said light source deviates from said predetermined value;

c) a third comparator (Z4) having one input coupled to said second end of said filament and to said converter means through a current sensing resistor and a second input coupled to said reference voltage, said third comparator generating a signal when current through said light source decreases abruptly while a voltage across the said light source is constant.

7. The system defined by claim 1 wherein said optical spectrum sensor means comprises:

a) a fiber optic link having one end adjacent said incandescent light source so that said one end of said fiber optic link is parallel to said filament, and a second end adjacent to first and second optical filters;

b) a first detector coupled to said first optical filter and a second detector coupled to said second optical filter;

c) a comparator whose inputs are coupled to the outputs of said first and second detectors, said comparator generating a DC signal having an amplitude proportional to the difference between the outputs produced by said first and second detectors.

8. A method for preventing filament arc in a broken light source, comprising the steps of:

a) detecting a condition indicating an impending filament break;

b) disconnecting the light source from a power source upon detection of said condition.

9. A method of claim 8, wherein the step of detecting said condition comprises the steps of:

a) measuring a plurality of characteristics of said light source;

b) comparing said characteristics with a predetermined danger condition.

10. A method of claim 9, wherein the step of measuring a plurality of conditions comprises the steps of:

a) measuring a current through said light source and;

b) measuring a voltage across said light source.

11. A method of claim 9, said danger condition comprising:

a) an abrupt decrease in current through the light source and;

b) a constant voltage difference across said light source.

* * * * *